Sept. 20, 1966  H. G. SWANSON  3,274,490
FLUID DAMPED PERMANENT MAGNET CORE METER MOVEMENT WITH
A FLOAT SUPPORTED AND FILAR SUSPENDED COIL
Filed Nov. 23, 1962
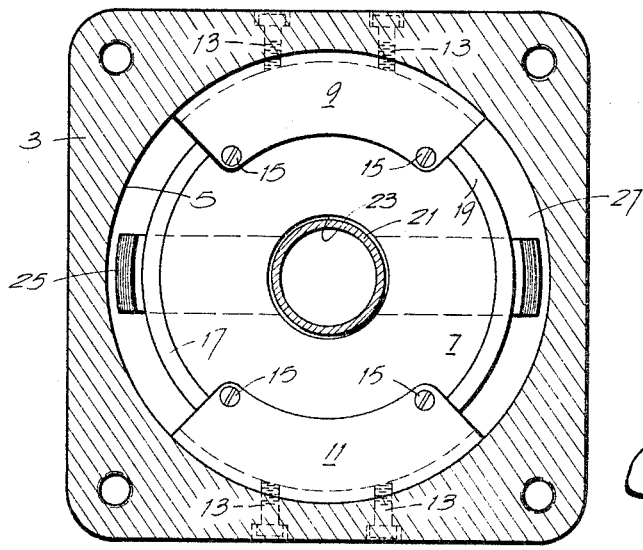
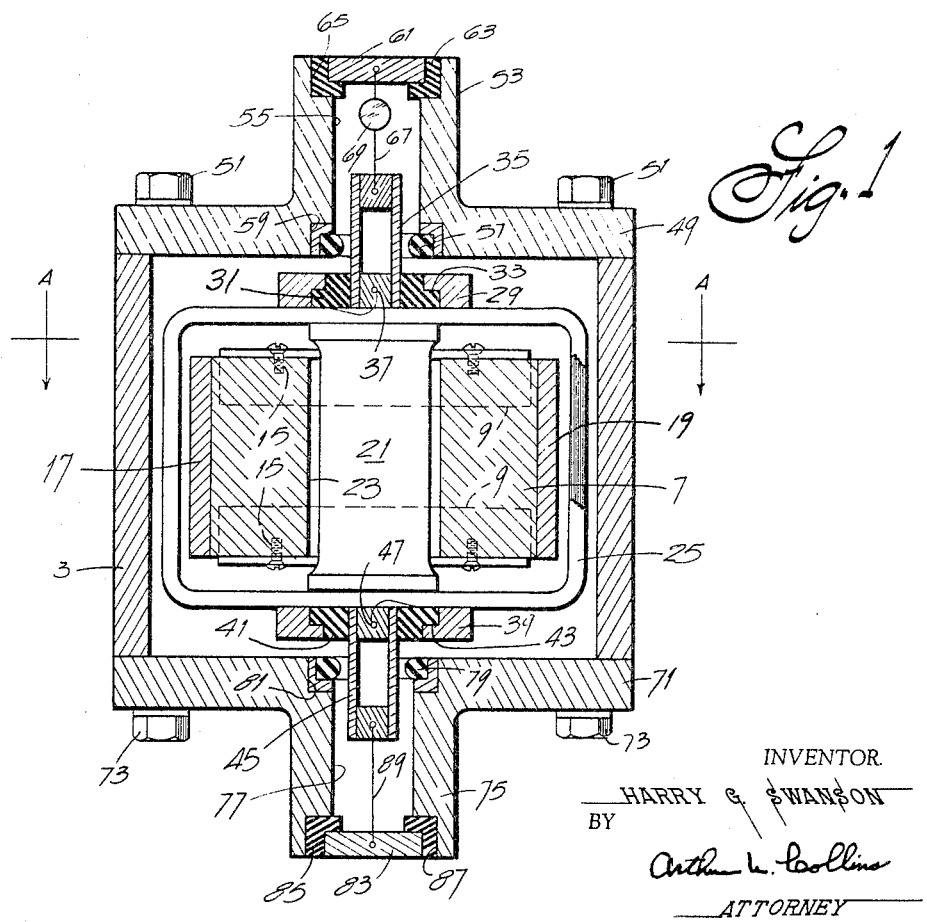
INVENTOR.
HARRY G. SWANSON
BY
Arthur L. Collins
ATTORNEY 3,274,490
FLUID DAMPED PERMANENT MAGNET CORE METER MOVEMENT WITH A FLOAT SUPPORTED AND FILAR SUSPENDED COIL
Harry G. Swanson, Tewksbury, Mass., assignor, by mesne assignments, to the United States of America as represented by the Secretary of the Navy
Filed Nov. 23, 1962, Ser. No. 239,851
1 Claim. (Cl. 324—154)

The present invention relates to novel and improved electrical measuring and detecting apparatus and more particularly to a novel and improved D'Arsonval type electrical measuring instrument.

The D'Arsonval principle is commonly used to measure and detect minute electrical currents and potentials. The high sensitivity of meters employing this principle however is limited primarily by the torsion of the suspension, which must be strong enough to support the relatively heavy moving coil assembly. As a result, various types of floats have been devised and used in the past to buoy and reduce the effective weight of the coil assembly on the torsion wire or ribbon. Considerable difficulty has been experienced heretofore, however, in providing a floating type D'Arsonval instrument which is compact, relatively simple in construction and still highly sensitive in use.

It is therefore a principal object of the present invention to provide a novel and improved D'Arsonval electrical measuring instrument of the floated movement type.

It is a further object of the present invention to provide a novel and improved D'Arsonval electrical measuring instrument which combines the attributes of compactness, simplicity, and high sensitivity.

Other objects and many of the attendant advantages of this invention will be readily appreciated as the same becomes better understood by reference to the following detailed description when considered in connection with the accompanying drawing wherein:

FIG. 1 is a cross-sectional view of a preferred embodiment of the present invention;

FIG. 2 is a sectional view taken along line A—A of the embodiment shown in FIG. 1.

In general the improved floated D'Arsonval movement instrument of the invention includes a housing which is constructed of magnetic material, an annular core disposed within a bore in the housing, a float mounted for rotation within and on the axis of the core, and a coil which is symmetrically secured to the float and which is disposed within the magnetic field in the airgap between the housing and the core. Such an instrument has been found to combine the features of high sensitivity of the conventional floated D'Arsonval device with the compactness and relative simplicity of non-floated device.

A preferred embodiment of the present invention is illustrated in FIG. 1 and FIG. 2 of the drawing. As shown therein, the flux return housing 3 is constructed of a magnetically permeable material and has a centrally located bore 5 therethrough. The annular shaped core 7, which comprises a usual transversely magnetized permanent magnet, is concentrically mounted within the bore 5 preferably by means of the arcuate sector plates 9 and 11 which are secured to the housing 3 by means of bolt members 13 and to the core 7 by means of bolt members 15. Pole pieces 17 and 19 constructed of suitable magnetic material are attached to the core 3 in a conventional manner between the sector plates 9 and 11. The hollow spool-shaped float 21 which is disposed within the axially located aperture 23 through the core 7 provides a rotatable mounting for the moving coil 25 which is radially affixed to opposite extremities of the cylindrical float 21. The vertically disposed portions of the moving coil 25 are medially positioned for unobstructed movement within the airgap 27 formed between the outer cylindrical surface of the pole pieces of core 7 and the inner cylindrical surface of the housing 3. The flat plate member 29 is secured in any suitable manner to the coil 25 opposite the upper portion of the float 21. The flanged insulating sleeve 31 is positioned as shown within the aperture 33 through the plate 29, the center of the aperture and the sleeve being aligned with the extended axis of the float 21. The electrically conductive tubular bearing element or trunnion 35 is affixed within the sleeve 31 and is electrically connected to one extremity of the coil 25 through the conductive enclosed base—of the element 35 and connector 37. Similarly, the flat plate member 39 is secured to the coil 25 opposite the lower portion of the float 21. The flanged insulating sleeve 41 is positioned as shown within the aperture 43 through the plate 39, the center of the aperture and the sleeve being aligned with the extended axis of the float 21. The electrically conductive tubular bearing element or trunnion 45 is affixed within the sleeve 41 and is electrically connected to the other extremity of the coil 25 through the conductive enclosed base—of the element 45 and connector 47. The upper extremity of housing 3 is enclosed by end plate 49 which is preferably constructed of a suitable transparent material and is secured to the housing in any suitable manner such as is shown by bolts 51. The outwardly extending cylindrical projection or boss 53 and the bore 55 therethrough are aligned with the extended axis of the float 21 and sleeve 35. The ringstone bearing 57 is electrically non-conductive and is secured in a counterset portion 59 of the bore 55. The electrical connector or the like 61 which may be of any conventional design and its concentric insulating cup-shaped sleeve 63 are secured in any suitable manner in the counterset portion 65 of the bore 55. The electrically conductive torsion wire 67 is secured at one end in the tubular element 35 of the moving coil assembly and at its opposite end to the internal extremity of the electrical connector 61. The mirror element or the like 69 is attached in any suitable manner to the torsion wire 67. The lower extremity of housing 3 is enclosed by end plate 71 which is secured to the housing preferably by bolts 73. The outwardly extending cylindrical projection or boss 75 and the bore 77 therethrough are aligned with the extended axis of the float 21 and sleeve 45. The ringstone bearing 79 is electrically non-conductive and is secured in a counterset portion 81 of the bore 77. The electrical connector 83 and its concentric insulating sleeve 85 are secured in any suitable manner in the counterset portion 87 of the bore 77. The electrically conductive torsion wire 89 is secured at one end in the tubular element 45 of the moving coil assembly and at the other end to the internal extremity of the electrical connector 83. The entire moving coil assembly is preferably emersed in a clear, non-electrical conductive fluid of selected specific gravity within the housing 3.

In operation, prior to the application of a source of electrical energy across electrical connectors 61 and 83 of the instrument, the restoring force of the torsion wires 67 and 89 maintains the moving coil assembly at its normal zero position in the airgap 27 midway between the sector plates 9 and 11. When a source of electrical energy is coupled to receptacles 61 and 83, current flows from one terminal of the source through electrical connector 61, torsion wire 67, tubular element 35, the windings of the moving coil 25, the tubular element 45, torsion wire 89, and electrical connector 83 back to the other terminal of the source. Torque developed on the moving coil assembly and angular movement of the mirror 69 against the restraining force of wires 67 and 89 provides an accurate measure of the magnitude of current flow through the circuit. Movement of the entire assembly through the fluid in housing 3 provides desired damping action.

Buoyancy of the float 21 in the fluid substantially increases the overall sensitivity of the instrument by decreasing the effective weight of the assembly on torsion wires 67 and 89. The oversize ringstone bearings 57 and 79 protect the instrument from shock and undue vibration.

Obviously many modifications and variations of the present invention are possible in the light of the above teachings. It is therefore to be understood that within the scope of the appended claim the invention may be practiced otherwise than as specifically described.

What is claimed is:

A permanent magnet core type electrical measuring instrument comprising:

(a) a housing including a cylindrical flux return portion constructed of a magnetically permeable material and end covers constructed of a non-magnetically permeable material;

(b) an annular transversely magnetized permanent magnet core;

(c) non-magnetic arcuate sector plates which position the annular core within the housing so as to provide a uniform air gap between the core and the cylindrical portion of the housing;

(d) pole pieces secured to diametrically opposed peripheral pole portions of the core;

(e) a fluid of predetermined specific gravity which fills the housing;

(f) a hollow cylindrical float rotatably mounted within the opening of the annular core and extending axially only slightly beyond the ends of the core;

(g) an electrical coil symmetrically mounted across opposite ends of the float and encircling the core, in an extended radial plane of the core portions of individual conductors of the coil being disposed in the air gap between the core and the housing;

(h) electrically conductive trunnions secured to opposite ends of the float along the extended axis of the float;

(i) an annular ringstone bearing mounted on the housing and encircling each trunnion;

(j) an electrical connector disposed in the housing on the extended axis of the core opposite each trunnion;

(k) an electrically conductive torsion wire connected between each juxtaposed electrical connector and trunnion;

(l) a mirror secured to one torsion wire;

(m) and means for electrically connecting one end of the coil to one trunnion and the other end of the coil to the other trunnion.

References Cited by the Examiner

UNITED STATES PATENTS 2,623,083 12/1952 Schlumberger _____ 324—125
2,901,702 8/1959 Endlich _____ 324—151

WALTER L. CARLSON, *Primary Examiner.*

R. V. ROLINEC, *Assistant Examiner.*